United States Patent [19]

Harris

[11] Patent Number: 4,777,646
[45] Date of Patent: Oct. 11, 1988

[54] COMMUNICATION SYSTEM

[76] Inventor: Arlene J. Harris, 1165 N. Clark St., Ste. 601, Chicago, Ill. 60610

[21] Appl. No.: 914,123

[22] Filed: Oct. 1, 1986

[51] Int. Cl.$^4$ .............................................. H04M 1/57
[52] U.S. Cl. ...................................... 379/91; 379/144; 379/59
[58] Field of Search ...................... 379/91, 144, 59, 60, 379/63; 235/375-385; 455/33

[56] References Cited

U.S. PATENT DOCUMENTS

| | | | |
|---|---|---|---|
| 4,233,473 | 11/1980 | Frost | 379/59 |
| 4,399,330 | 8/1981 | Kuenzel | 455/56 |
| 4,439,636 | 3/1982 | Newkirk | 379/91 |
| 4,549,308 | 7/1982 | LoPinto | 455/26 |
| 4,625,276 | 11/1986 | Benton et al. | 364/408 |
| 4,675,863 | 7/1987 | Paneth et al. | 370/50 |

FOREIGN PATENT DOCUMENTS 0080838  5/1982  Japan ..................................... 379/59

OTHER PUBLICATIONS

A. Turbat "Telepayment and Electronic Money, The Smart Card, " *Commutation & Transmission* No. 5, 12/82, pp. 11-20.
S. B. Weinstein, "Smart Credit Cards; The Answer to Cashless Shopping, " *I.E.E.E. Spectrum,* 2/84, pp. 43-49.
J. Free "36 Cellular Phones, " *Popular Science,* 8/85, pp. 78-80.

*Primary Examiner*—Robert Lev
*Attorney, Agent, or Firm*—Baker & McKenzie

[57] ABSTRACT

Cellular mobile telephone stations which are intended for installation and use in public transportation facilities, e.g., taxicabs, limousines, rental cars, etc. are equipped to support credit card billing of transient customers for use of the station services. The cellular pay stations, from the viewpoint of serving cellular carrier facilities, are indistinguishable from standard cellular mobile stations. The activities of the credit card stations are supported by an administrative processor which is connected to a standard telephone line of the public switched telephone network. The cellular stations and the administrative processor exchange data messages over a standard telephone connection. The data messages are used to establish operating options and parameters of the credit card mobile stations; compile records in the administrative processor to permit the assignment of billing responsibility to transient customers for use of the stations and connected facilities, and control the stations for administrative and commercial reasons.

36 Claims, 4 Drawing Sheets

COMMUNICATION SYSTEM

TECHNICAL FIELD

This invention relates to a system for establishing records for billing transient customers of credit card stations of cellular mobile radio systems.

BACKGROUND ART

Broad changes in the laws governing the ownership and operation of communication systems and terminal facilities have provided opportunities for participation by persons other than a dominant common carrier.

Currently pay subscriber stations of a wire line switching system are provided by a Common Carrier or by a reseller of WATS or other bulk facilities. Common Carrier plant facilities inherently include apparatus and operator personnel to handle both coin and credit card calls from their pay stations. However, a reseller of bulk billed facilities must provide tandem switching facilities along with a separate administrative network for handling customer billing. An example of such a reseller system is found in U.S. Pat. No. 4,439,636. The cost of installation and maintenance of the tandem switch and the administrative network are substantial. Furthermore, in these systems, each phone call requires two simultaneous, separate connections, one between the station and the tandem switch and one between the tandem switch and the public network for the full duration of hhe call. Such systems require relatively large numbers of physically clustered stations to be economically justified.

Additionally, there are privately owned credit card and coin stations which are connected to business lines of a wire switching system. These stations screen credit cards locally, originate calls in accordance with customer requests and maintain a full record of charges. From time to time the charges are transmitted to a billing computer.

DISCLOSURE OF THE INVENTION

In accordance with this invention, an administrative processor and a plurality of cellular mobile stations are equipped to support credit card billing of transient customers for their use of a cellular mobile station and the connected facilities. The central administrative processor which can be reached by a direct dial telephone call, is, by way of example, connected to a standard line of the public switched network, and cellular stations are standard subscribers of a cellular carrier.

In addition to the standard station facilities, the station comprises customer administrative input and display apparatus, a data modem, and a local administrative processor for controlling the station in support of credit card billing, and for conducting two way, high speed data communication with the central administrative processor. The high speed data communication is employed to: establish station operating parameters; establish records to permit assignment of billing responsibility for use of the station; and control the station for technical or commercial reasons.

Advantageously, from the viewpoint of the servicing cellular mobile system, cellular mobile pay stations in accordance with this invention are indistinguishable from standard subscriber stations of that system.

Additionally, administrative processor control of the parameters of a pay station quickly accomplishes station changes without a visit of or to a technician.

THE DRAWING

The invention is illustrated more or less diagramatically in the accompanying drawing wherein.

DETAILED DESCRIPTION

Figure 1:
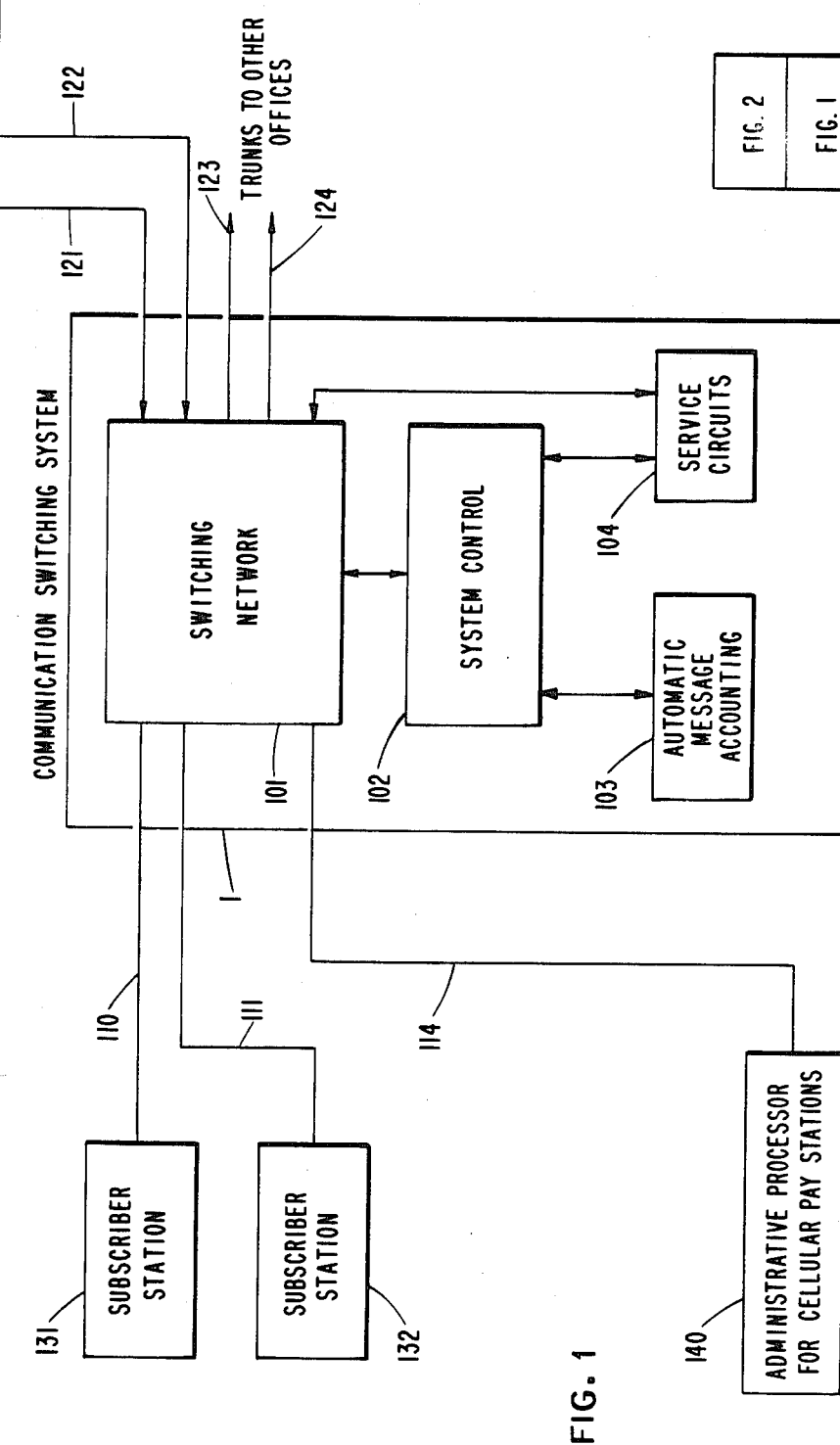
FIG. 1 is a schematic diagram of a communication switching system and connected apparatus.
Figure 5:
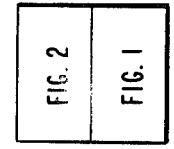
FIG. 5 shows the arrangement of FIGS. 1 and 2.

The switching network 1 of FIG. 1 is a typical electronic end office of the public switched network. An example of such an office is the 1 ESS manufactured by Western Electric and disclosed in U.S. Pat. No. 3,570,008. The switching network 101, as illustrated in FIG. 1, terminates subscriber lines 110, 111 on the left side, and terminates trunks and service circuits on the right side. The trunks 121 and 122 interconnect the end office 1 of FIG. 1 to the cellular mobile radio system of FIG. 2, and the trunks 123 and 124 interconnect the end office 1 and other offices of the public switched network.

Throughout this description, the lines, trunks, and subscriber stations are all illustrative of larger undefined numbers of the same elements. For example, trunk circuits are provided in sufficient numbers to adequately handle the anticipated traffic.

The subscriber stations 131 and 132 are standard business and residential stations.

The administrative processor 140 is associated with the administration of pay stations constructed in accordance with this invention. Although only one administrative processor 140 is shown in Fig.1, it is contemplated that two or more administrative processors, each terminated on a standard line of the switched network, will be employed to assure rapid access to the processor and reliability in the event of a failure of a processor or of the access thereto.

The system control 102, typically, is a stored program processor which detects requests for service from the lines 110, 111 and from the trunks 121-124, establishes connections through the network 101 between lines trunks and service circuits in accordance with calling and supervisory information from the lines and trunks, maintains system records, controls the automatic message accounting 103, and performs routine system maintenance. The automatic message accounting 103 compiles records of billable usage by the connected lines, e.g., 110, 111.

Figure 2:
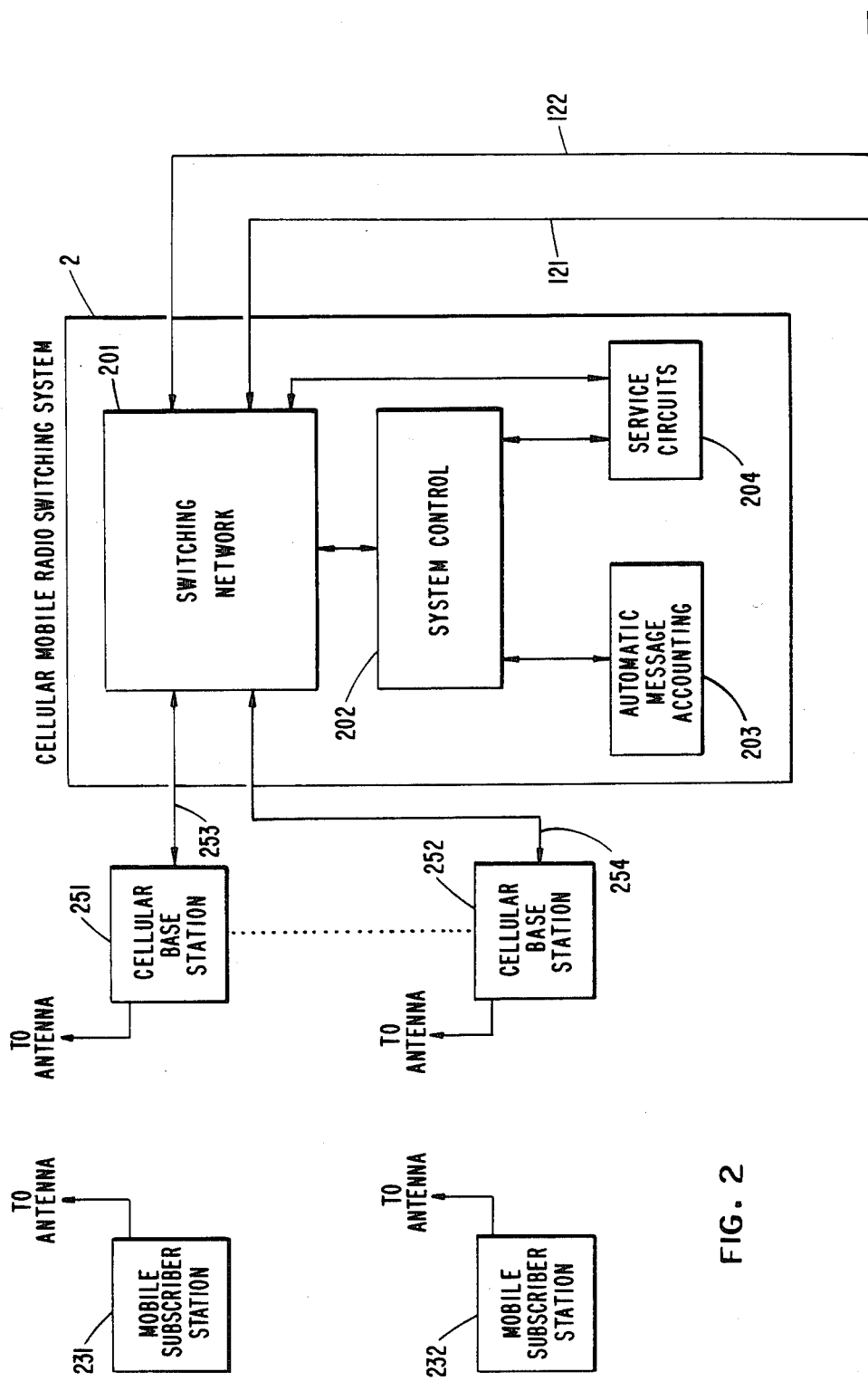
FIG. 2 is a schmmatic diagram of a cellular mobile radio system.

The cellular mobile system 2 of FIG. 2 serves to selectively interconnect mobile subscriber stations, e.g., 231, 232 to the public switched network and to stations not shown, which are connected to parts of the swtching network 201 and which can be reached by direct dial telephone calls. The switching system 2 is illustrated as being substantially the same as the end office 1 of FIG. 1. The trunks, e.g., 121, 122, which terminate on the right side of the network 201, interconnect the cellular system with the wire office of FIG. 1, and the trunks 253, 254 interconnect the cellular switching network and the cellular base stations.

In contrast to the wire communication system of FIG. 1, there may be two or more cellular mobile radio carriers in a geographical area, and each carrier has its own subscribers. The mobile subscriber station 231 and the pay mobile subscriber station 232 are representative of large numbers of stations served by the various cellular carriers of a geographical area. Each cellular carrier has its own radio base station and switching system including automatic message accounting facilities, e.g., 203 of FIG. 2. Although cellular mobile subscriber stations are subscribers of a particular cellular carrier, they may access the national network through the facilities of a carrier that has agreed to serve subscribers of another carrier. A station outside the territory of its cellular carrier is termed a "roamer", and the mobile set is equipped to indicate that a station is in the "roam" state. A surcharge may apply to calls to and from a roamer.

Figure 3:
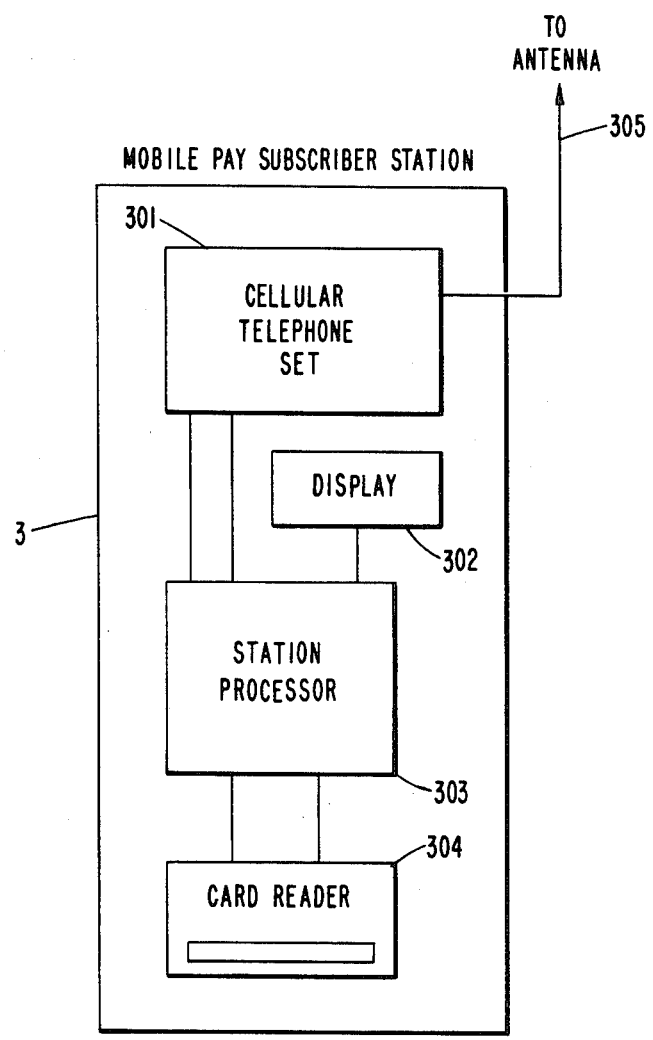
FIGS. 3 and 4 are schematic diagrams of a cellular mobile pay station in accordance with the invention.

The cellular pay station 3 of FIG. 3 comprises a standard cellular telephone set 301, an antenna line 305, station processors 303, the display 302 and the card reader 304. In FIG. 3, the station processors 303 comprise the normal station processor which is an integral part of a standard cellular subscriber station and a separate local administrative processor for handling the functions added in accordance with this invention. The use of independent processors for the normal station functions and for the added functions is a matter of designer choice since a single processor could handle both functions.

The card reader 304 serves to read credit cards presented by customers of the pay station, and the display 302 displays station status, instructions to the customer and other information intended for customer consumption, e.g., general commercial data messages.

Figure 4:
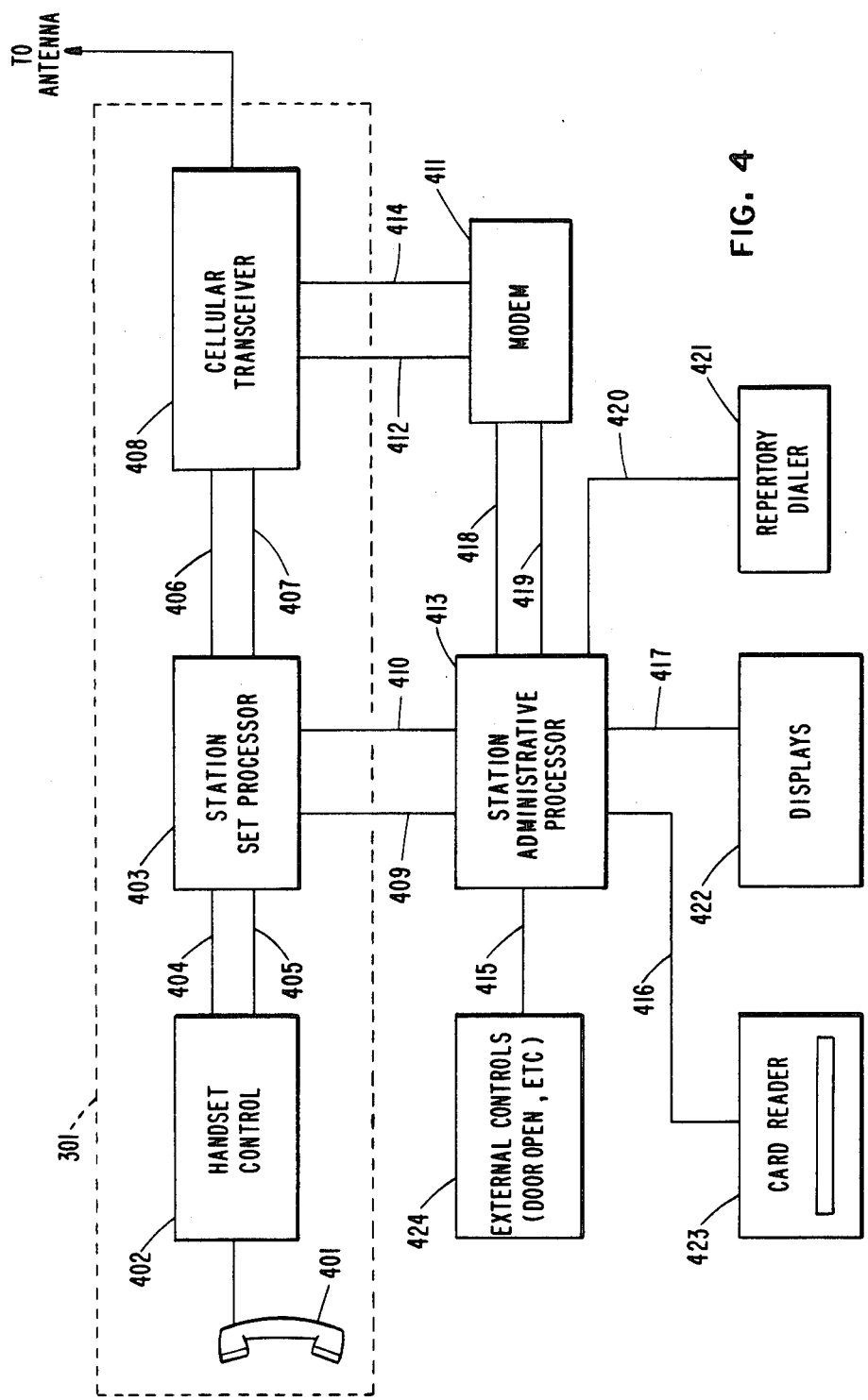

FIG. 4 is a more detailed diagram of the mobile pay subscriber station of FIG. 3. The cellular telephone set 301, which is enclosed in dotted lines in FIG. 4, comprises: the handset 401; the handset control 402; the station set processor 403; the cellular transceiver 408; and the interconnecting lines 404–407. The portion of FIG. 4 which is not enclosed by the dotted line represents facilities added to the station set by this invention.

The station set processor 403 and the administrative processor 413 correspond to the station processors 303 of FIG. 3. The station administrative processor 413, in response to customer requests, controls the station set 301 to initiate an administrative call through a cellular base station, the cellular mobile radio system and the communication switching system 1 of FIG. 1 to an administrative processor 140. The station processor communicates with the administrative processor 140 via the modem 411, the interconnecting lines 418 and 419, and the cellular transceiver 408. The station administrative processor 413 and the system administrative processor 140 exchange data messages as explained later herein.

The card reader 423 interprets credit cards presented thereto and passes the credit card contents to the processor 413. The displays 422 provide station status and operating instruction messages. The displays may be variable content displays in which the messages are electronically formatted, e.g., seven element per character displays, or they may be fixed messages which are selectively illuminated or otherwise activated. As used herein, the term display is intended to include formatted voice messages or other audible signals and hard message copy.

The repertory dialer 421 is an optional feature which permits a user to easily call any one of a number of commercial establishments, e.g., hotels, restaurants, etc., where the calling numbers of those establishments have been downloaded to the station by the central administrative processor or alternatively loaded locally.

CALL PROCESSING

The following description of the processing of calls to and from a cellular mobile credit card pay station constructed in accordance with this invention will illustrate the operation and features of cellular mobile pay stations. For the purposes of the following discussion, it is assumed that the station parameters have been established and that the station has not been precluded from originating and completing calls for any technical or commercial reason. The setting of station parameters by administrative messages from the central administrative processor will be described later herein.

It is anticipated that cellular mobile pay stations in accordance with this invention will be installed in rental cars, limousines, taxicabs, etc. The station is "locked" until a customer's credit card has been validated and responsibility for charges for subsequent station use has been assigned to that customer. The station is then unlocked to permit origination and termination of calls. The station will remain unlocked and responsibility will continue until the occurrence of a "significant control event". In the case of an installation in a rental car, a significant event may be the removal of the key from the ignition; in the case of a limousine or taxicab, the opening of a door may be a "significant" event which terminates responsibility and locks the station.

Although cellular mobile radio systems are widely used, many customers of taxicabs, limousines, rental cars, etc., may not be familiar with the operation of a cellular mobile station. Therefore, pay stations constructed in accordance with this invention mimic the operation of a station of a wire switching system. For example, standard cellular mobile subscriber stations do not receive dial tone from a central office, and call signaling information, i.e., digits of a called number are transmitted to the switching system upon depression of a send key in the station set as opposed to being automatically forwarded to the system. Credit card pay stations in accordance with this invention provide local dial tone at the station and automatically forward the call signalling information.

The following scenario for a cellular mobile pay station in accordance with this invention is for purpose of illustration only, and many variations may be made without departing from the invention.

Whenever the subscriber station receives power, it will be available to serve a customer; however, the station will remain locked, except for the completion of certain calls, e.g., 911 calls, until a customer has accepted responsibility for billing.

When power is first applied, the station set illuminates a flashing "Hello" display. The display flashes for one minute and then goes to a steady state. At the same time a "Slide Card" display is illuminated. Alternatively, in the case of limousines and taxicabs, the opening of a passenger door, as well as power up, may initiate the flashing "Hello" light.

A customer initiates a credit card call by presenting a card of an approved credit card company to the card reader 423. The station administrative processor 413 receives the credit card data via the line 416 and stores that data in its memory. The processor 413 may be arranged to screen the credit card data for e.g., expiration date, issuance of the card by an approved credit card company, etc. or the station may merely serve as a conduit for the credit card data. If the credit card data survives the local screening, or if the station processor is acting as a conduit, the station processor 413 initiates an administrative call to a central administrative processor e.g., 140 in FIG. 1; the "Hello" and "Slide Card" displays are extinguished and a "Checking Card" display is activated.

An administrative call is originated in the same way that any call through a cellular system is originated and the administrative data is sent and received via the modem 411. Upon receipt of data from the card reader 423, the station administrative processor 413 conditions the displays as described above, and generates and sends the calling number of the telephone line of an administrative processor, e.g., processor 140 and a "send" signal to the station processor 403. The station set alerts the cellular system of the origination of a call; a radio channel is assigned to the call, and connections are established through the networks between the calling cellular mobile station and the called central administrative processor 140. In the event that the central administrative processor is busy, the call will be repeated automatically. If the second administrative call is unsuccessful, a call will be automatically placed to a second central administrative processor which is not shown. That processor may be connected to a line of the same switching system that serves processor 140 or may be connected to a line of a different switching system. If the station has left its home cellular system, the station set roam indicator is activated and the telephone number used to originate a call to an administrative processor will be an incoming WATS number. Accordingly, administrative calls from a roamer do not incur individually charged long distance charges.

When a call attempt is successful, the calling administrative processor 413 and the called administrative processor "shake hands" via the modem 421, the cellular transceiver 408 and the established connection. Upon successful completion of that process, the station processor 423 exchanges formatted data messages with the central processor 140. For the purpose of illustration, fixed format, variable length data messages are described. Each administrative data message comprises a header, a message type identifier, data, and an end of message signal. For the purpose of this description, there is no reference to either parity checking, Hamming coding or any other error checking and/or correcting plan which can be added to this system. Data messages comprise variable numbers of eight bit binary bytes which are coded as ASCII alphanumeric or decimal characters, or as eight one bit binary numbers, each of which, when set to "1", establish corresponding station operating options.

The following is a table of illustrative formatted data messages.

MOBILE TO BASE

TYPE MESSAGE CONTENT
10 Credit Card Data
11 Station identity, last number called, Station activity since last registration.
12 Station Setup data
13 Station Activity Summary
14 General Data Message

BASE TO MOBILE

20 Disable station
21 Enable station
22 Lock station
23 Access Accepted, calendar date
24 Access Denied, calendar date
25 Request for all station information
26 Request for station parameter data
27 Acknowledge, message type
28 Negative acknowledge, message type
29 General Data Message

STATION SETUP

30 Define mobile unlock code
31 Establish environment lock options
32 Establish roam options
33 Phone number of central processor
34 Phone number of alternate processor
35 Phone number of roam processor
36 Station Identification
37 Add card type to screening table
38 Delete card type from table
40 Identity of last invalid card used
41 Calendar date
42 Load repertory dialer memory Upon completion of a successful handshake, the processor 413 initiates "Customer Registration" by sending the customer's credit card data to the central processor 140 in a type 10 Mobile to Base message and retains a copy of that data in its memory. Upon receipt of that message, the processor 140 checks the message as to form. If the message is proper as to form, the processor 140 returns a type 27 message which acknowledges receipt of the message and repeats the identity of the type of message acknowledged. However, if the processor 140 finds the received message not to be of proper form, it sends a type 28 negative acknowledge message. The station is conditioned to expect an acknowledgment signal within a short time after the type 10 message was sent. In the event that a positive acknowledgment is not received within that period of time or if a negative acknowledgment message is received, the station repeats the type 10 message. However, if as expected, the station receives a positive acknowledgment data message, it continues the "Customer Registration" process by sending a type 11 message.

The acknowledgment of receipt of the type 10 message is typical of the data exchange protocol and acknowledgment of other messages is not described herein.

Although not described herein, the message exchange protocol may include the transmission of acknowledgment messages from the mobile station to the processor 140.

The type 10 and type 11 messages together identify both the customer who proposes to accept billing responsibility and the station, and summarize the station activity which has occurred between the last registration message from the station and the current registration message. In the illustrative example, the station activity information comprises: the last number called under the prior registration; the number of calls placed under that registration; and the total duration of those calls. All of this information, as a matter of course, is retained in the memory of the station administrative processor 431.

On the basis of the complete registration data, the administrative processor 140 checks the customer credit card information for credit worthiness and checks the station information to authenticate the current technical and credit status of the station. It is possible that the customer credit card is acceptable for billing but the station is on a credit "black list". In that event, the processor 140 transmits a type 20 disable station message. The processor 140, after receipt of an acknowledgment from the mobile station, provides a supervisory "hang-up" signal to terminate the connection to the mobile. Upon receipt of a type 20 message, the station terminates the registration call to the processor 140, activates appropriate displays and the station is out of service until a type 21 station enable signal is received from the processor 140.

If the station passes screening but the proffered credit card is not acceptable, the central processor sends a type 24, card rejected message and provides a supervisory "hang-up" signal to terminate the connection to the mobile. Upon receipt of a type 24 message, the station terminates the registration call to the processor 140, the station remains locked, the "checking card" display is deactivated, and a "Sorry" display is activated. The station processor 431 retains the identity of the rejected card and subsequent attempts to use that same card are rejected at the station.

However, if the proffered credit card and the station both pass the screening process, the central processor sends a type 23, access accepted message to the station from which the registration message was received. Upon receipt of that message, the station terminates the registration call to the processor 140, the "checking card" display is deactivated, the station is conditioned to originate and accept calls, and a "Lift Handset and Dial" display is activated.

Upon removal of the handset from the cradle, local dial tone is connected to the handset receiver to mimic wire station operation. When the customer uses the keypad to select the first digit of the called number, dial tone is removed from the receiver, Multi-Frequency digit tones are heard in the receiver as digit selection proceeds, and the first digit is displayed to the customer.

As the remaining digits of the called number are selected, the respective MF tones are heard and those digits are displayed. To further mimic the operation of a wire station, the processor 431 monitors the digit registration for interdigital time-out and generates a "send" signal when the standard interdigital time is exceeded. This serves to automatically forward the called number to the cellular mobile base station and switching machine to originate a call.

When the customer replaces the handset 401 in the cradle or depresses the switch hook to terminate a call, the station will remain enabled to permit origination and receipt of calls until the occurrence of a "significant control event" as defined by the station operating parameters. For the purpose of illustration only, in the case of a station in a short haul vehicle, e.g., a taxicab, the station remains unlocked until the passenger door is opened. In the case of stations installed in long haul vehicles, e.g., extended run limousines, the station may remain unlocked for five minutes after termination of a call or until the passenger door is opened, whichever comes first. The station processor 431 maintains a record of the last card accepted; therefore, if the same valid card is proffered an outgoing or incoming call will be permitted without a new registration message.

In the preceding description, the exchange of data messages is initiated from the station when a customer originates an outgoing call. Therefore, the processor 431 is conditioned to expect data messages from the central processor 140. However, when the mobile station is in the idle state, incoming calls may be incoming voice calls or incoming administrative data message calls, e.g., station setup, maintenance, etc. The station processor 431 is arranged to recognize and handle incoming data message calls, and only if the call is an incoming voice call is the station ringing or other alerting signal activated.

Type 14 and type 29 messages provide for the exchange of administrative information not provided by other message types, and for the exchange of commercial data. For example, a type 14 message in conjunction with a printer in the mobile can be used for dispatching a limousine driver. In the same way, a type 29 message can be used to record charge billing of the limousine services.

Messages types 30 through 38, 41 and 42 are base to mobile messages which serve to establish station operating options. For example, message type 31 is employed to establish the time in minutes that the station remains unlocked after a customer has terminated a call, and to define the significant control events which serve to lock a station, e.g., open driver's door, open passenger's door, turn off the ignition.

For administrative reasons it may be necessary or desirable to establish a new mobile unlock code and/or a new mobile identification code. Message types 30 and 36 are provided to serve those needs.

While some vehicles equipped with cellular mobile credit card stations may require "roam" privileges, not all credit card stations require this feature. Therefore, the type 32 message is provided to condition a station to permit or exclude service when in the roam state.

Message types 33, 34, and 35 permit the central processor 140 to define the telephone numbers which the station employs to reach the central administrative processor, the alternate central processor and the roam processor, respectively.

Message types 37 and 38 serve, respectively, to add and delete credit card types in the station screening list.

Message type 40 provides the identity of the last credit card which was proffered at the station and rejected, and message type 41 sets the calendar in the station.

Message type 42 is employed to load the memory of the repertory dialer 421. The numbers stored in this memory are the calling numbers of local establishments such as hotels, restaurants, airlines, etc.

CREDIT CARD BILLING

The cellular mobile system carrier, by use of the records compiled by the automatic message accounting facilities 203 of the cellular system of FIG. 2, provides to its subscribers detailed billing information about their cellular mobile station use. The information conveyed to the processor 140 by the registration type 10 and 11 messages, permits assignment of that detailed station use to the transient customers without duplicating the automatic message accounting facilities of the cellular carrier and without detailed time of call information from the mobile station.

Upon receipt of detailed usage information from the cellular carrier, the registration files compiled by the central administrative processors, e.g., 140 and the usage files are merged to create the basis for entry of debits to the various credit card systems. As indicated earlier herein, a mobile station may access two or more administrative processors during a billing period. Therefore, the registration records of all administrative processors must be referenced when assigning billing responsibility to customers.

The typical detailed usage summary provided subscribers by a cellular carrier contains the following information for each call: mobile station telephone number; called telephone number; date comprising day, month and year; time of start of call; and time of end of call. In addition to this usage information, the charge for each call is stated. The usage information is obtained from the records compiled at the cellular switch and the charges to the subscribers is determined by a separate billing processor, not shown.

The record compiled by an administrative processor, e.g., processor 140, comprises: credit card type; credit card identification; credit card expiration date; called telephone number; date comprising day, month and year; and time of registration entry. All of the information compiled by the processor 140, except for date and time, is received from the mobile stations via type 10 and type 11 messages during call registration. Date and time are added by the processor 140.

The call start and end times of the station usage record and the times added to the registration records in the processor 140, even with complete correspondence of the clocks in the processor 140 and the cellular system, will not coincide. Therefore, assignment of customer billing responsibility requires correlation of data principally on the basis of the last called telephone numbers obtained during customer registration.

The administrative processor 140 may comprise any one of a number of commercially available computers, e.g., an IBM model XT computer, including a keyboard and crt display. In addition to the exchange of data messages with the mobile stations and the compilation of resulting usage data, the processor 140 maintains statistics about station use and about system performance.

The foregoing description of system structure and operation is but illustrative of my invention and many changes may be made without departing from the spirit and scope of my invention.

What is claimed is:

1. A communication system comprising:
   a plurality of cellular mobile radio subscriber stations, each station comprising a communication set including means for generating call signalling and supervisory signals and display means for displaying station status information and station operating instructions;
   a cellular mobile radio system for serving said cellular mobile radio subscriber stations for the origination and termination of calls;
   said cellular mobile radio system comprising: a first plurality of trunk circuits; means for selectively interconnecting said cellular mobile radio subscriber stations and said trunk circuits; and automatic message accounting means for storing detailed data about said interconnections for establishing detailed billing records for said cellular mobile subscriber stations;
   a public communications switching system comprising: a plurality of line circuits, a second plurality of trunk circuits, certain of said trunk circuits of said second plurality being coupled to at least some of said trunk circuits of said first plurality, a switching network for selectively interconnecting said lines and said trunks in response to calling and supervisory signals;
   certain of said cellular mobile subscriber stations being equipped to support billing of calling charges to individual customer accounts for which accounts no records are maintained by said automatic message accounting means;
   an administrative processor which can be reached by a direct dial telephone call for receiving, storing and processing administrative data from said certain subscriber stations and for selectively generating and transmitting administrative messages to said certain subscriber stations;
   said certain stations each further comprising: means for generating control signals and billing data defining said individual customer accounts;
   station control means for controlling said station comprising:
   register means for storing said billing data;
   first control means responsive to said control signals for generating administrative call request signals;
   second control means responsive to said administrative call request signals for originating and conducting bi-directional administrative message communication exchanges between said mobile station and said administrative processor via said mobile radio system and said network; and
   third control means responsive to certain of said administrative messages from said administrative processor for selectively enabling and disabling said station for the origination of calls by customers from said station.

2. A communication system in accordance with claim 1, wherein said means for generating control signals and billing data is a reader for cards having billing data indicia stored therein.

3. A communication system in accordance with claim 1, wherein said station control means further comprises: means for screening said billing data for plausibility; and means for selectively disabling said station for the origination of calls by the customer who proffered the card if the billing data is determined to be implausible and for generating signals for selectively enabling and disabling said second control means.

4. A communication system in accordance with claim 3 wherein: if said billing data is determined to be implausible, said second control means is disabled until a card with plausible billing data is presented.

5. A communication system in accordance with claim 1 wherein: said station, when enabled by said third control means, remains enabled until the occurrence of a significant control event.

6. A communication system in accordance with claim 1 wherein: said administrative messages exchanged between said stations and said administrative processor comprise formatted, coded data messages which comprise a message type identifier and data.

7. A communication system in accordance with claim 1 wherein: certain of said messages which are transmitted from said stations to said administrative processor comprise customer registration messages which contain, as data, said billing data defining customer accounts; and others of said messages transmitted from said stations to said administrative processor comprise station registration messages which contain, as data, a summary of station activity between the preceding station registration message and the current registration message.

8. A communication system in accordance with claim 7 wherein said summary of station activity data comprises: the telephone number of the last call placed under the immediately preceding customer registration; the number of calls placed by the station between the time of the immediately preceding customer registration message and the current registration message; and the total time duration of those calls.

9. A communication system in accordance with claim 7 wherein: said administrative processor includes credit card "negative credit files"; and said processor: screens said customer billing data against said negative credit files for credit worthiness, and returns to a station a positive or a negative acknowledgment message to indicate that a customer's request to accept responsibility for billing of subsequent calls to and from the station has been accepted or denied.

10. A communication system in accordance with claim 9 wherein: said station control means in response to a negative acknowledgment message activates appropriate displays to advise the customer of the rejection of credit, and rejects further efforts to register the customer's card that was rejected by said negative acknowledgment message.

11. A communication system in accordance with claim 9 wherein: said station control means in response to a positive acknowledgment message, terminates the registration call; activates appropriate displays which advise the customer to proceed with a call; and "unlocks" the station to permit a customer to complete a call.

12. A communication system in accordance with claim 9 wherein: wherein said administrative processor from time to time initiates calls to a selected one of said stations for the purpose of bi-directional data communication with said station; and said station comprises means for differentiating between calls from said administrative processor and calls from other stations and for initiating a procedural "handshake" between the station processor and the administrative processor if a call is found to be from an administrative processor.

13. A communication system in accordance with claim 1 wherein: certain ones of the administrative messages transmitted from said administrative processor to said stations comprise station "set-up" messages which, as data, define station operating options and parameters; and said stations in response to said set-up messages selectively enable and disable the station operating options in accordance with the received data, and establish station parameters of operation in accordance with the received data.

14. A communication system in accordance with claim 1 wherein: said stations comprise a repertory dialer including a memory for storing calling numbers of telephone stations to be called by use of said repertory dialer; and wherein further ones data messages transmitted from said administrative processor comprise "load repertory dialer memory" messages which, as data, define telephone numbers; and said stations, in response to said load messages, store the defined telephone numbers in the memory of said repertory dialer.

15. A communication system in accordance with claim 1 wherein: said stations further comprise a printer for making hard copies of data messages received from said administrative processor.

16. A communication system in accordance with claim 1 wherein: said system comprises a plurality of administrative processors which are each connected to corresponding line circuits.

17. A communication system in accordance with claim 6 wherein: data messages transmitted from said administrative processor to said stations include "telephone number of administrative processor" messages which define the telephone numbers of primary and alternative administrative processors; said stations in response to said messages store said telephone numbers; and said stations utilize the stored numbers to originate data communication with said administrative processors.

18. A communication system in accordance with claim 17 wherein: said stations further comprise means responsive to signals from said cellular system for indicating that a station has physically moved outside the serving area of its home cellular system and is in the "roam" state, and said station when in the roam state uses the telephone number of an alternate administrative processor to originate data communication.

19. A communication system comprising:
a plurality of subscriber stations, each station comprising a communication set including means for generating call signalling and supervisory signals and display means for displaying station status information and station operating instructions;
a communications switching system for serving said subscriber stations for the orgination and termination of calls comprising: a plurality of line circuits, a plurality of trunk circuits, a switching network for selectively interconnecting said lines and said trunks in response to calling and supervisory signals; and automatic message accounting means for storing detailed data about said interconnections for establishing detailed billing records for said subscriber stations;
certain of said subscriber stations being equipped to support billing of calling charges to individual customer accounts for which accounts no records are maintained by said automatic message accounting means
an administrative processor which can be reached by a direct dialed telephone call for receiving, storing and processing administrative data from said certain subscriber stations and for selectively generating and transmitting administrative messages to said certain subscriber stations;
said adminstrative processor stores summaries of interconnection acitvity corresponding to said individual customer accounts for which no records are maintained in said automatic message accounting means.
said certain stations each further comprising: means for generating control signals and billing data defining said individual customer accounts;
station control means for controlling said station comprising:
register means for storing said billing data;
first control means responsive to said control signals for generating administrative call request signals;
second control means responsive to said administrative call request signals for originating and conducting bi-directional administrative message communication exchanges between said mobile station and said administrative processor via said network; and third control means responsive to certain of said administrative messages from said administrative processor for selectively enabling and disabling said station for the origination of calls by customers from said station.

20. A communication system in accordance with claim 19, wherein said means for generating control signals and billing data is a reader for cards having billing data indicia stored therein.

21. A communication system in accordance with claim 19, wherein said station control means further comprises: means for screening said billing data for plausibility, and means for selectively disabling said station for the origination of calls by the customer who proffered the card if the billing data is determined to be implausible and for generating signals for selectively enabling and disabling said second control means.

22. A communication system in accordance with claim 21 wherein: if said billing data is determined to be implausible, said second control means is disabled until a card with plausible billing data is presented.

23. A communication system in accordance with claim 19 wherein: said station, when enabled by said third control means, remains enabled until the occurrence of a significant control event.

24. A communication system in accordance with claim 19 wherein: said administrative messages exchanged between said stations and said administrative processor comprise formatted, coded data messages which comprise a message type identifier and data.

25. A communication system in accordance with claim 19 wherein: certain of said messages which are transmitted from said stations to said administrative processor comprise customer registration messages which contain, as data, said billing data defining customer accounts; and others of said messages transmitted from said stations to said administrative processor comprise station registration messages which contain, as data, a summary of station activity between the preceding station registration message and the current registration message.

26. A communication system in accordance with claim 25 wherein: said summary of station activity data comprises: the telephone number of the last call placed under the immediately preceding customer registration, the number of calls placed by the station between the time of the immediately preceding customer registration message and the current registration message, and the total time duration of those calls.

27. A communication system in accordance with claim 25 wherein: said administrative processor includes credit card "negative credit files"; and said processor: screens said customer billing data against said negative credit files for credit worthiness, and returns to a station a positive or a negative acknowledgement message to indicate that a customer's request to accept responsibility for billing of subsequent calls to and from the station has been accepted or denied.

28. A communication system in accordance with claim 27 wherein: said station control means, in response to a negative acknowledgement message, terminates the registration call, activates appropriate displays to advise the customer of the rejection of credit, and rejects further efforts to register the customer's card that was rejected by said negative acknowledgement message.

29. A communication system in accordance with claim 27 wherein: said station control means in response to a positive acknowledgement message, terminates the registration call, activates appropriate displays which advise the customer to proceed with a call and "unlocks" the station to permit a customer to complete a call.

30. A communication system in accordance with claim 27 wherein: wherein said administrative processor from time to time initiates calls to a selected one of said stations for the purpose of bi-directional data communication with said station; and said station comprises means for differentiating between calls from said administrative processor and calls from other stations and for initiating a procedural "handshake" between the station processor and the administrative processor if a call is found to be from an administrative processor.

31. A communication system in accordance with claim 19 wherein: certain ones of the administrative messages transmitted from said administrative processor to said stations comprise station "set-up" messages which, as data, define station operating options and parameters; and said stations in response to said set-up messages selectively enable and disable the station operating options in accordance with the received data, and establish station parameters of operation in accordance with the received data.

32. A communication system in accordance with claim 19 wherein: said stations comprise a repertory dialer including a memory for storing calling numbers of telephone stations to be called by use of said repertory dialer; and wherein further ones data messages transmitted from said administrative processor comprise "load repertory dialer memory" messages which, as data, define telephone numbers; and said stations, in response to said load messages, store the defined telephone numbers in said memory of said repertory dialer.

33. A communication system in accordance with claim 19 wherein: said stations further comprise a printer for making hard copies of data messages received from said administrative processor.

34. A communication system in accordance with claim 19 wherein: said system comprises a plurality of administrative processors which are each connected to corresponding line circuits.

35. A communication system in accordance with claim 24 wherein: data messages transmitted from said administrative processor to said stations include "telephone number of administrative processor" messages which define the telephone numbers of primary and alternative administrative processors; said stations in response to said messages store said telephone numbers; and said stations utilize the stored numbers to originate data communication with said administrative processors.

36. A communication system in accordance with claim 35 wherein: said stations further comprise means responsive to signals from said cellular system for indicating that a station has physically moved outside the serving area of its home cellular system and is in the "roam" state, and said station when in the roam state uses the telephone number of an alternate administrative processor to orginate data communication.

* * * * *